(12) United States Patent
Sun et al.

(10) Patent No.: US 8,265,548 B2
(45) Date of Patent: Sep. 11, 2012

(54) RELAY FRAME STRUCTURE FOR SUPPORTING TRANSPARENT AND BIDIRECTIONAL RELAYS

(75) Inventors: Li-Hsiang Sun, San Diego, CA (US); Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/612,617

(22) Filed: Nov. 4, 2009

(65) Prior Publication Data

US 2010/0112938 A1    May 6, 2010

Related U.S. Application Data

(60) Provisional application No. 61/111,706, filed on Nov. 5, 2008.

(51) Int. Cl.
*H04Q 7/20* (2006.01)

(52) U.S. Cl. .......... 455/11.1; 455/7; 455/24; 455/422.1; 455/403; 455/426.1; 370/310; 370/315; 370/324; 370/326; 370/329

(58) Field of Classification Search ................ 455/11.1, 455/7, 24, 422.1, 403, 426.1, 426.2, 500, 455/517, 445, 550.1; 370/310, 315, 324, 370/326, 329, 343
See application file for complete search history.

(56) References Cited

U.S. PATENT DOCUMENTS

| | | | |
|---|---|---|---|
| 2007/0280188 A1 | 12/2007 | Kang et al. | |
| 2008/0165881 A1* | 7/2008 | Tao et al. | 375/267 |
| 2008/0219229 A1 | 9/2008 | Zheng | |
| 2009/0181615 A1* | 7/2009 | So et al. | 455/7 |
| 2010/0315989 A1* | 12/2010 | Reznik et al. | 370/315 |

FOREIGN PATENT DOCUMENTS

KR    10-0787969    12/2007

* cited by examiner

*Primary Examiner* — Keith Ferguson
(74) *Attorney, Agent, or Firm* — Lee, Hong, Degerman, Kang & Waimey

(57) ABSTRACT

A method for transmitting data includes receiving at a first relay station first data from a parent station during a downlink period comprising a plurality of downlink zones. A network coding zone is one of the plurality of downlink zones and is located at an end of the downlink period, and the first data is received in at least one of the plurality of downlink zones other than the network coding zone. The method further includes receiving at the first relay station from a child station, second data during an uplink zone, and transmitting third data by the first relay station to the child station, during the network coding zone using a resource. The method further includes transmitting the third data to the parent station, during the network coding zone, using the resource. The third data results from the first data being effectively logically XOR-ed to the second data.

10 Claims, 6 Drawing Sheets

RELAY FRAME STRUCTURE FOR SUPPORTING TRANSPARENT AND BIDIRECTIONAL RELAYS

CROSS-REFERENCE TO RELATED APPLICATIONS

Pursuant to 35 U.S.C. §119(e), this application claims the benefit of earlier filing date and right of priority to Provisional Application No. 61/111,706, filed on Nov. 5, 2008, the contents of which are incorporated by reference herein in their entirety.

FIELD OF THE INVENTION

The present invention relates to wireless communications, and in particular, to transmitting data using relay stations.

DESCRIPTION OF THE RELATED ART

FIG. 1 is a diagram showing an exemplary two-tier cell 102 of a communication network. As shown in FIG. 1, the two-tier cell 102 includes a base station (BS) 103 and mobile stations (MSs) 105a and 105b. As further shown in FIG. 1, the two-tier cell 102 includes a BS coverage area, which is represented by the region inside area 107 having radius R1, and a relay station (RS) coverage area, which is represented by the region between the area 109 having radius R2 and the area 107.

A number of mobile stations (MSs), such as MS 105a and MS 105b, can be located throughout the two-tier cell 102 at a given time. The MSs within the BS coverage area, such as MS 105a, have a direct connection to the BS 103 and an RS, whereas the MSs within the RS coverage area, such as MS 105b, have a connection to the BS via an RS.

For example, a number of MSs can be evenly or randomly distributed over the two-tier cell 102, where the traffic demand of each MS in the two-tier cell 102 is independent and identically distributed. For ease of description, R1 in the present example is defined as having a value of one and R2 is defined as having a value of two.

The ratio of transmissions by the BS 103 to the transmissions by the RS can be represented as $(2^2):(2^2-1^2)$ or 4:3. Furthermore, the ratio of the RS link load to the BS 103 access link load is 3:1, regardless of the total number of RSs in the two-tier cell 102. Therefore, the link load of the RSs in the two-tier cell 102 can be significantly greater than the link load of the BS 103 and as a result, the performance of the two-tier cell 102 may be reduced.

SUMMARY

In one aspect of the present invention, a method for transmitting data includes receiving at a first relay station first data from a parent station during a downlink period comprising a plurality of downlink zones, where a network coding zone is one of the plurality of downlink zones and is located at an end of the downlink period and where the first data is received in at least one of the plurality of downlink zones other than the network coding zone; receiving at the first relay station from a child station, second data during an uplink zone; transmitting third data by the first relay station to the child station, during the network coding zone using a resource; and transmitting the third data to the parent station, during the network coding zone, using the resource, wherein the third data transmitted to the child relay station and the parent station results from the first data being effectively logically XOR-ed to the second data.

In another aspect of the present invention, a method for transmitting data includes receiving at a first relay station first data from a parent station during a downlink period comprising a plurality of downlink zones, wherein the first data is received during a downlink receive zone in the plurality of downlink zones and wherein the downlink receive zone is located at a beginning of the downlink period; and transmitting the first data by the first relay station, or by both the first relay station and the parent station of the first relay station, to a child station during one of the plurality of downlink zones other than the downlink receive zone. The child station receives the first data as if it is transmitted from the parent station of the first relay station.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless communication network and associated entities configured in accordance with the IEEE 802.16 standards family commonly referred to as WiMAX. However, alternatives to such implementations are envisioned and teachings with regard to the WiMAX standard are generally applicable to other standards and air interfaces as well. Moreover, the use of certain terms to describe various embodiments should not limit such embodiments to a certain type of wireless communication system, such as WiMAX. Various embodiments are also applicable to other wireless communication systems using different air interfaces and/or physical layers including, for example, frequency division multiple access (FDMA), time division multiple access (TDMA), code division multiple access (CDMA), wideband CDMA (W-CDMA), and universal mobile telecommunications system (UMTS), the long term evolution (LTE) of the UMTS, and the global system for mobile communications (GSM). By way of non-limiting example only, further description will relate to a WiMAX communication system, but such teachings apply equally to other system types.

Figure 2:
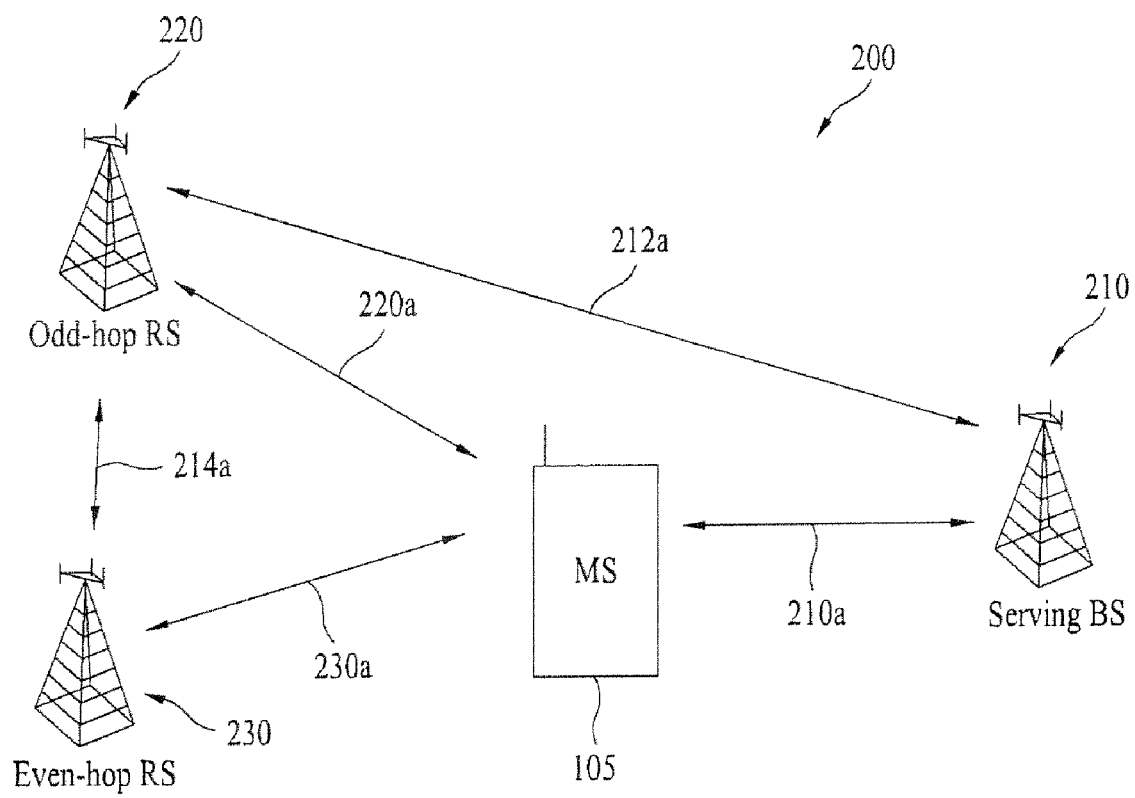
FIG. 2 shows an exemplary wireless communication network in accordance with various embodiments of the present invention.

FIG. 2 shows wireless communication network 200 in accordance with various embodiments of the present invention. In one embodiment, the relay station (RS) 220 can be an odd-hop RS in direct communication with the serving base station (BS) 210, and the RS 230 can be an even-hop RS in direct communication with the RS 220. For example, the RS 220 and the RS 230 can be implemented as either a transparent relay or a bidirectional relay. In some cases, the MS 105 may be implemented as a mobile terminal, user equipment, subscriber station, and the like.

Signal 210a is shown transmitted from serving BS 210 to mobile station (MS) 105. Signal 212a is shown transmitted from the serving BS 210 to the RS 220. Signal 214a is shown transmitted from the RS 220 to the RS 230. Signals 220a and 230a are shown transmitted to the MS 105 from the RS 220 and RS 230, respectively.

In general, the serving BS 210 may be configured to communicate with MSs located within operational range of the BS 210. In this figure, the serving BS 210 serves the MS 105. Signaling provided by the various serving and neighboring BSs and transparent and/or bidirectional RSs are often in the form of multiple frames (e.g., orthogonal frequency-division multiple access (OFDMA) frames). Further examples of frames, timing, and other signaling features will be described in more detail in conjunction with later figures. It is further understood that network 200 may alternatively be implemented using multiple MSs 105, and with most any number of BSs and RSs.

Figure 1:
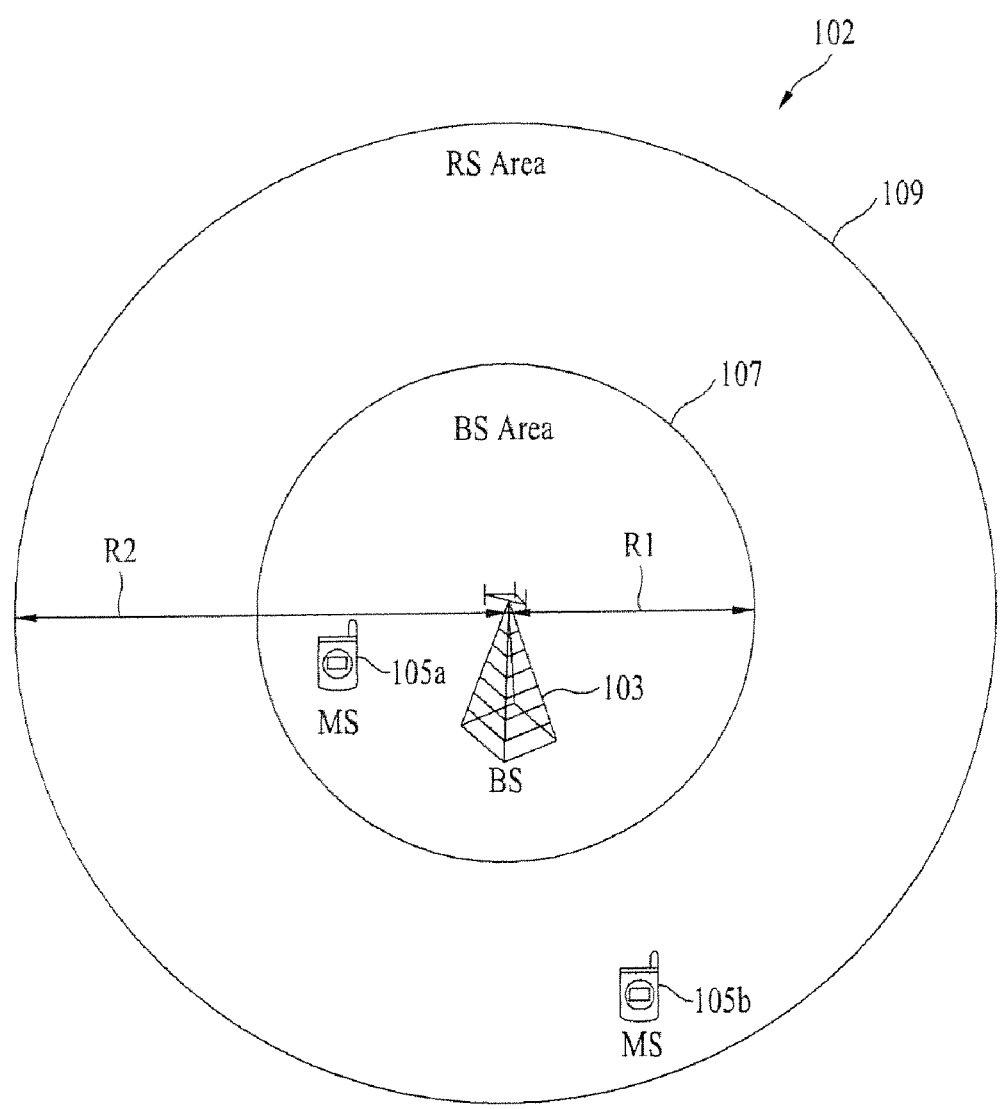
FIG. 1 is a diagram showing an exemplary two-tier cell 102 of a communication network.
Figure 3:
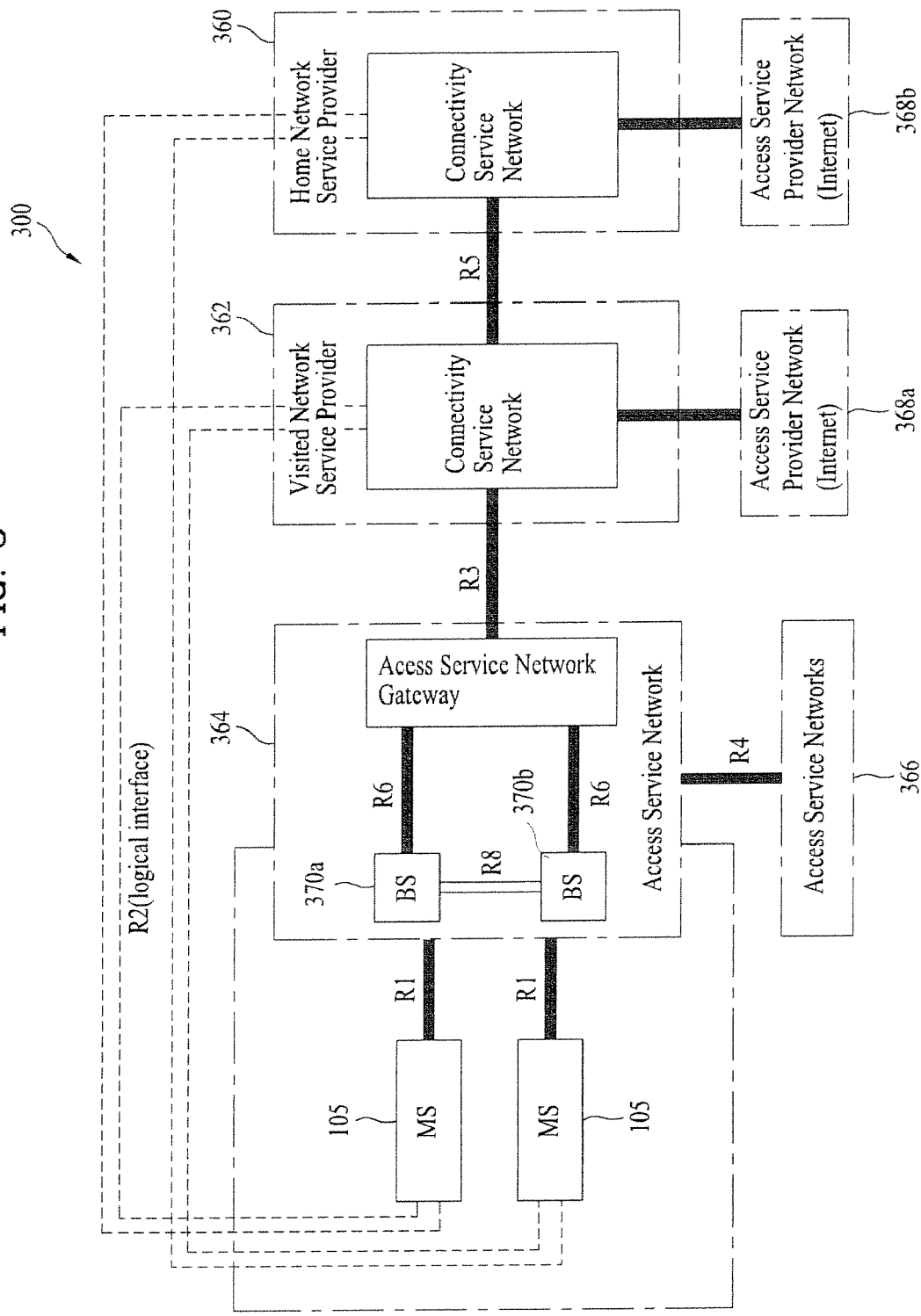
FIG. 3 is a block diagram of an exemplary communication network in accordance with various embodiments of the present invention.

FIG. 3 is a block diagram of an exemplary communication network in accordance with various embodiments of the present invention. In this figure, communication network 300 includes a home network service provider ("home NSP") 360, a visited network service provider ("visited NSP") 362, an access service network (ASN) 364, access service networks 366, access service provider networks 368a and 368b. MSs 102 are separately shown in communication with respective serving BSs 370a, 370b. In some embodiments, the BSs 370a, 370b, are implemented in a manner similar to that of the BSs of FIGS. 1 and 2.

A network service provider, such as home NSP 360 or visited NSP 362, may include a business entity that provides IP connectivity and WiMAX services to WiMAX subscribers compliant with the service level agreement it establishes with WiMAX subscribers. A technique for providing these services includes the NSP establishing an agreement with one or more network access providers, which are commonly implemented as business entities providing WiMAX radio access infrastructure to one or more WiMAX network service providers.

ASN 364 typically includes a logical boundary and represents an aggregation of functional entities and corresponding message flows associated with the access services. ASN 364 often includes a boundary for functional interoperability with WiMAX clients, WiMAX connectivity service functions, and aggregation of functions embodied by different vendors, for example.

In FIG. 3, ASN 364 is shown sharing R1 reference point (RP) with MSs 102, R3 RP with a connectivity service network (CSN) of visited NSP 362, and a R4 RP with ASN 366. ASN 364 typically includes one or more base stations and one or more instances of an ASN gateway (ASN-GW). The R4 reference point is typically implemented for control and bearer planes for interoperability between similar or heterogeneous ASNs. Interoperability between various types of ASNs may be accomplished using the specified protocols and primitives exposed across R1, R3 and R4 reference points.

In some embodiments, the depicted base stations are entities that embody a full instance of the WiMAX media access control (MAC) and physical (PHY) layers in compliance with the relevant transmission protocol. In the embodiment of FIG. 3, these base stations may be configured to function or otherwise implement the IEEE 802.16 suite of applicable standards, and may host one or more access functions. In some scenarios, the base stations each represent one sector with one frequency assignment and incorporates scheduler functions for both uplink and downlink resources.

Connectivity (e.g., reachability) of BSs 370a, 370b to more than one ASN-GW may be required or desired to facilitate load balancing, redundancy, and the like. Note that each BS 370a and/or 370b is a logical entity, and a physical implementation of such logical entities may implement one or more base stations.

Reference point R1 typically includes protocols and procedures to facilitate communication between MS 105 and ASN 364. If desired, reference point R1 may also include additional protocols related to the management plane.

Reference point R2 generally includes protocols and procedures to facilitate communication between MS 105 and one or more CSNs. Reference point R2 is shown as a logical interface such that it does not reflect a direct protocol interface between a MS and the CSN.

The authentication part of reference point R2 is shown between MSs 102 and the CSN of home NSP 360. However the ASN and CSN of visited NSP 362 may partially or completely process the aforementioned procedures and mechanisms. Reference point R2 may also support IP host configuration management between the MSs 110 and the CSN (of either the home NSP 360 or the visited NSP 362).

Reference point R3 often includes a set of control plane protocols between ASN 364 and the CSN to support authentication, authorization, accounting (AAA), and the like, associated with a user (e.g., MS 105), and subscribed services across different access technologies. For example, AAA may include mechanisms for secure exchange and distribution of authentication credentials and session keys for data encryption.

Reference point R4 often includes a set of control and bearer plane protocols originating/terminating in various functional entities of an ASN that coordinate the mobility of MSs 102 between ASNs and ASN-GWs. In some scenarios, R4 is the only interoperable RP between similar or heterogeneous ASNs.

Reference point R5 may include a set of control plane and bearer plane protocols for internetworking between the CSN of the home NSP 360 and may be operated by the visited NSP 362.

The ASN gateway (ASN-GW) in ASN 364 is shown as a logical entity that represents an aggregation of control plane functional entities that are either paired with a corresponding function in the ASN (e.g., a BS instance), a resident function in the CSN, or a function in another ASN, such as ASN 366. The ASN-GW may also perform bearer plane routing or bridging function. ASN-GW implementation may include redundancy and load-balancing among several ASN-GWs.

In some embodiments, for each MS 105, a base station may be associated with only one default ASN GW. However, other embodiments permit ASN-GW functions for each MS to be distributed among multiple ASN-GWs located in one or more ASNs.

Reference point R6 generally includes a set of control and bearer plane protocols for communication between the BSs 370*a* and 370*b* and the ASN-GW. The bearer plane usually includes an intra-ASN data path between each of the BSs 370*a* and 370*b* and the ASN gateway. The control plane may include protocols for data path establishment, modification, and release control in accordance with the MS mobility events.

Reference point R7 may include an optional set of control plane protocols (e.g., for AAA and policy coordination in the ASN gateway), as well as other protocols for coordination between the various groups of functions identified in the reference point R6.

The decomposition of the ASN functions using the R7 protocols is optional.

Reference point R8 may include a set of control plane message flows and optionally bearer plane data flows between BSs 370*a* and 370*b* to facilitate handover. The bearer plane often includes protocols that allow the data transfer between BSs involved in handover of a certain MS, such as MSs 102. The control plane may include an inter-BS communication protocol and additional set of protocols that allow controlling of the data transfer between the BSs involved in handover of a certain MS.

In some embodiments, communication network 300 may include relay stations to provide improved coverage and/or capacity by establishing Layer-3 (L3) connectivity with an MS configured to communicate using a desired protocol (e.g., IEEE 802.16e, IEEE 802.16m, and the like).

Figure 4:
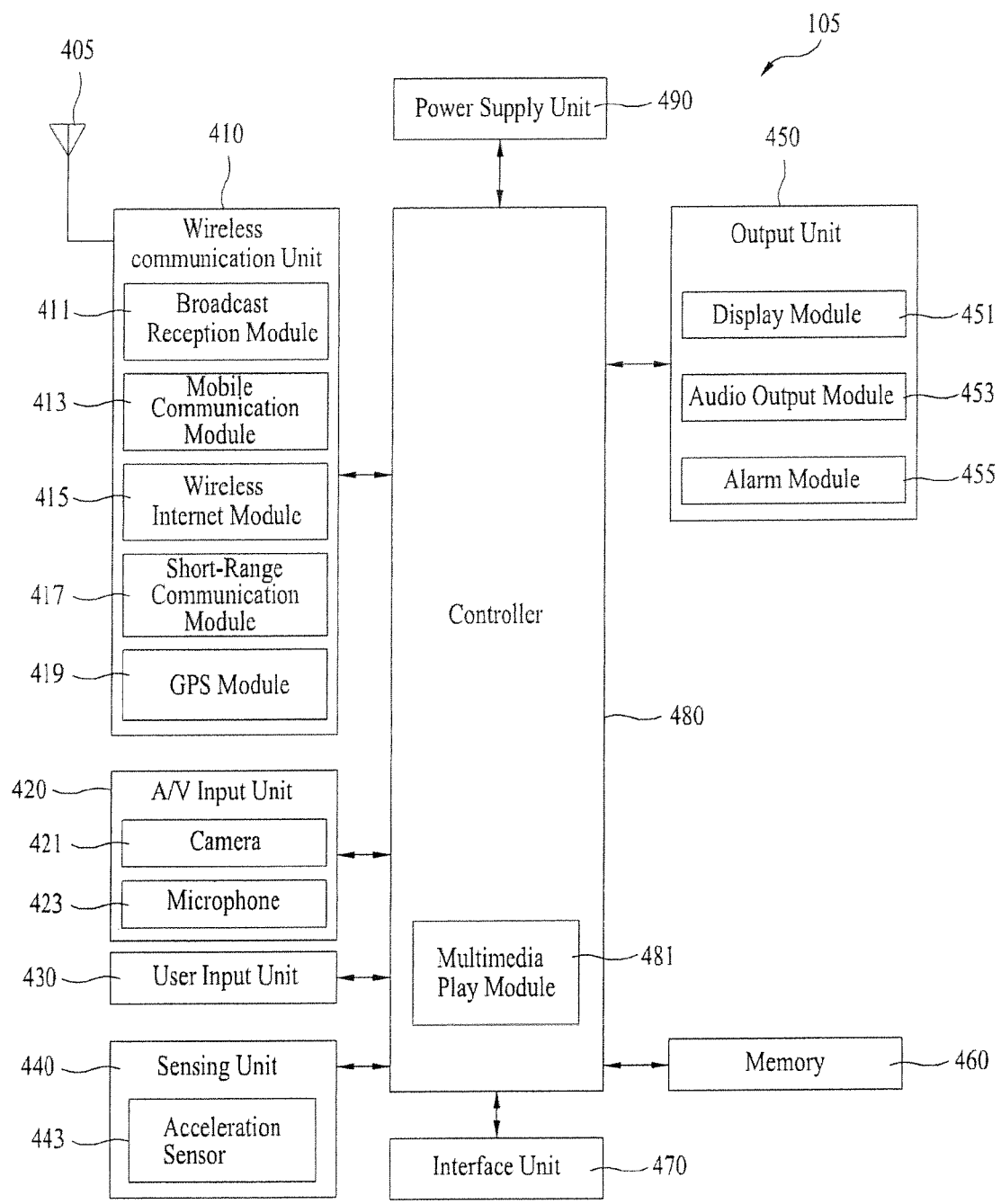
FIG. 4 is a block diagram showing in more detail various components which may be implemented in MS 105 according to various embodiment of the present invention.

FIG. 4 is a block diagram showing in more detail various components which may be implemented in MS 105 according to various embodiments of the present invention. It is understood that greater or fewer components than those shown may be implemented.

Referring to FIG. 4, the MS 105 may include a wireless communication unit 410, an audio/video (A/V) input unit 420, a user input unit 430, a sensing unit 440, an output unit 450, a memory 460, an interface unit 470, a controller 480, and a power supply unit 490. Two or more of the wireless communication unit 410, the A/V input unit 420, the user input unit 430, the sensing unit 440, the output unit 450, the memory 460, the interface unit 470, the controller 480, and the power supply unit 490 may be incorporated into a single unit, or some of the wireless communication unit 410, the A/V input unit 420, the user input unit 430, the sensing unit 440, the output unit 450, the memory 460, the interface unit 470, the controller 480, and the power supply unit 490 may be divided into two or more smaller units.

The wireless communication unit 410 may include a broadcast reception module 411, a mobile communication module 413, a wireless Internet module 415, a short-range communication module 417, and a GPS module 419.

The broadcast reception module 411 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to MS 105 through a mobile communication network. In this case, the broadcast-related information may be received by the mobile communication module 413, rather than by the broadcast reception module 411. The broadcast-related information may come in various forms, for example, electronic program guide (EPG) of digital multimedia broadcasting (DMB) or electronic service guide (ESG) of digital video broadcast-handheld (DVB-H).

Broadcast reception module 411 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 411 may be configured to be suitable for nearly all types of broadcasting systems other than those set forth herein.

The broadcast signal and/or the broadcast-related information received by the broadcast reception module 411 may be stored in memory 460.

The mobile communication module 413 transmits wireless signals to, or receives wireless signals from, at least one or more of a base station, an external station, and a server through a mobile communication network. The wireless signals may include various types of data according to whether the MS 105 transmits/receives voice call signals, video call signals, or text/multimedia messages.

The wireless Internet module 415 may be a module for wirelessly accessing the Internet. The wireless Internet module 415 may be embedded in the MS 105 or may be installed in an external device.

The short-range communication module 417 may be a module for short-range communication. The short-range communication module 417 may use various short-range communication techniques such as Bluetooth®, radio frequency identification (RFID), infrared data association (IrDA), ultra wideband (UWB), and ZigBee®. The GPS module 419 may receive position information from one or more satellites (e.g., GPS satellites).

The A/V input unit 420 may be used to receive audio signals or video signals. The A/V input unit 420 may include one or more cameras 421 and a microphone 423. The camera 421 processes various image frames such as still images or moving images captured by an image sensor during a video call mode or an image capturing mode. The image frames processed by the camera 421 may be displayed by a display module 451.

The image frames processed by the camera 421 may be stored in the memory 460 or may be transmitted outside the MS 105 through the wireless communication unit 410. The MS 105 may include more than two cameras.

The microphone 423 receives external sound signals during a call mode, a recording mode, or a voice recognition mode with the use of a microphone and converts the sound signals into electrical sound data. In the call mode, the mobile communication module 413 may convert the electrical sound data into data that can be readily transmitted to a mobile communication base station and then output the data obtained by the conversion. The microphone 423 may use various noise removal algorithms to remove noise that may be generated during the reception of external sound signals.

The user input unit 430 generates key input data based on user input for controlling the operation of the MS 105. The user input unit 430 may be implemented as a keypad, a dome switch, a touch pad (either static pressure or constant electricity), a jog wheel, or a jog switch. In particular, if the user input unit 430 is implemented as a touch pad and forms a mutual layer structure along with the display module 451, the user input unit 430 and the display module 451 may be collectively referred to as a touch screen.

The sensing unit 440 determines a current state of the MS 105 such as whether the MS 105 is opened or closed, the position of the MS 105 and whether the MS 105 is placed in contact with a user. In addition, the sensing unit 440 generates a sensing signal for controlling the operation of the MS 105.

For example, when the MS 105 is a slider-type mobile phone, the sensing unit 440 may determine whether the MS 105 is opened or closed. In addition, the sensing unit 440 may determine whether the MS 105 is powered by the power supply unit 490 and whether the interface unit 470 is connected to an external device.

The sensing unit 440 may include an acceleration sensor 443. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 443 representing different axial directions may be installed in the MS 105. Alternatively, only one acceleration sensor 443 representing a Z axis may be installed in the MS 105.

The output unit 450 may output audio signals, video signals, and alarm signals. The output unit 450 may include the display module 451, an audio output module 453, and an alarm module 455.

The display module 451 may display various information processed by the MS 105. For example, if the MS 105 is in a call mode, the display module 451 may display a user interface (UI) or a graphical user interface (GUI) for making or receiving a call. If the MS 105 is in a video call mode or an image capturing mode, the display module 451 may display a UI or a GUI for capturing or receiving images.

If the display module 451 and the user input unit 430 form a mutual layer structure and are thus implemented as a touch screen, the display module 451 may be used not only as an output device but also as an input device. If the display module 451 is implemented as a touch screen, the display module 451 may also include a touch screen panel and a touch screen panel controller.

The touch screen panel is a transparent panel attached onto the exterior of the MS 105 and may be connected to an internal bus of the MS 105. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 480. The control unit 480 then determines whether a touch input has been generated and which part of the touch screen panel has been touched based on the processed signals transmitted by the touch screen panel controller.

As described above, if the display module 451 and the user input unit 430 form a mutual layer structure and are thus implemented as a touch screen, the display module 451 may be used not only as an output device but also as an input device. The display module 451 may include at least one of a liquid crystal display (LCD), a thin film transistor (TFT)-LCD, an organic light-emitting diode (OLED), a flexible display, and a three-dimensional (3D) display.

The MS 105 may include two or more display modules 451. For example, the MS 105 may include an external display module and an internal display module.

The audio output module 453 may output audio data received by the wireless communication unit 410 during a call reception mode, a call mode, a recording mode, a voice recognition mode, or a broadcast reception mode or may output audio data present in the memory 460. In addition, the audio output module 453 may output various sound signals associated with the functions of the MS 105 such as receiving a call or a message. The audio output module 453 may include a speaker and a buzzer.

The alarm module 455 may output an alarm signal indicating the occurrence of an event in the MS 105. Examples of the event include receiving a call signal, receiving a message, and receiving a key signal. Examples of the alarm signal output by the alarm module 455 include an audio signal, a video signal, and a vibration signal.

The alarm module 455 may output a vibration signal upon receiving a call signal or a message. In addition, the alarm module 455 may receive a key signal and may output a vibration signal as feedback to the key signal.

Once a vibration signal is output by the alarm module 455, the user may recognize that an event has occurred. A signal for notifying the user of the occurrence of an event may be output by the display module 451 or the audio output module 453.

The memory 460 may store various programs necessary for the operation of the controller 480. In addition, the memory 460 may temporarily store various data such as a phonebook, messages, still images, or moving images.

The memory 460 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The MS 105 may operate a web storage, which performs the functions of the memory 460 on the Internet.

The interface unit 470 may interface with an external device that can be connected to the MS 105. The interface unit 470 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 470 may receive data from an external device or may be powered by an external device. The interface unit 470 may transmit data provided by an external device to other components in the MS 105 or may transmit data provided by other components in the MS 105 to an external device.

The controller 480 may control the general operation of the MS 105. For example, the controller 480 may perform various control operations regarding making/receiving a voice call, transmitting/receiving data, or making/receiving a video call.

The controller 480 may include a multimedia play module 481, which plays multimedia data. The multimedia play module 481 may be implemented as a hardware device and may be installed in the controller 480. Alternatively, the multimedia play module 481 may be implemented as a software program.

The power supply unit 490 is supplied with power by an external power source or an internal power source and supplies power to other components in the MS 105.

Figure 5:
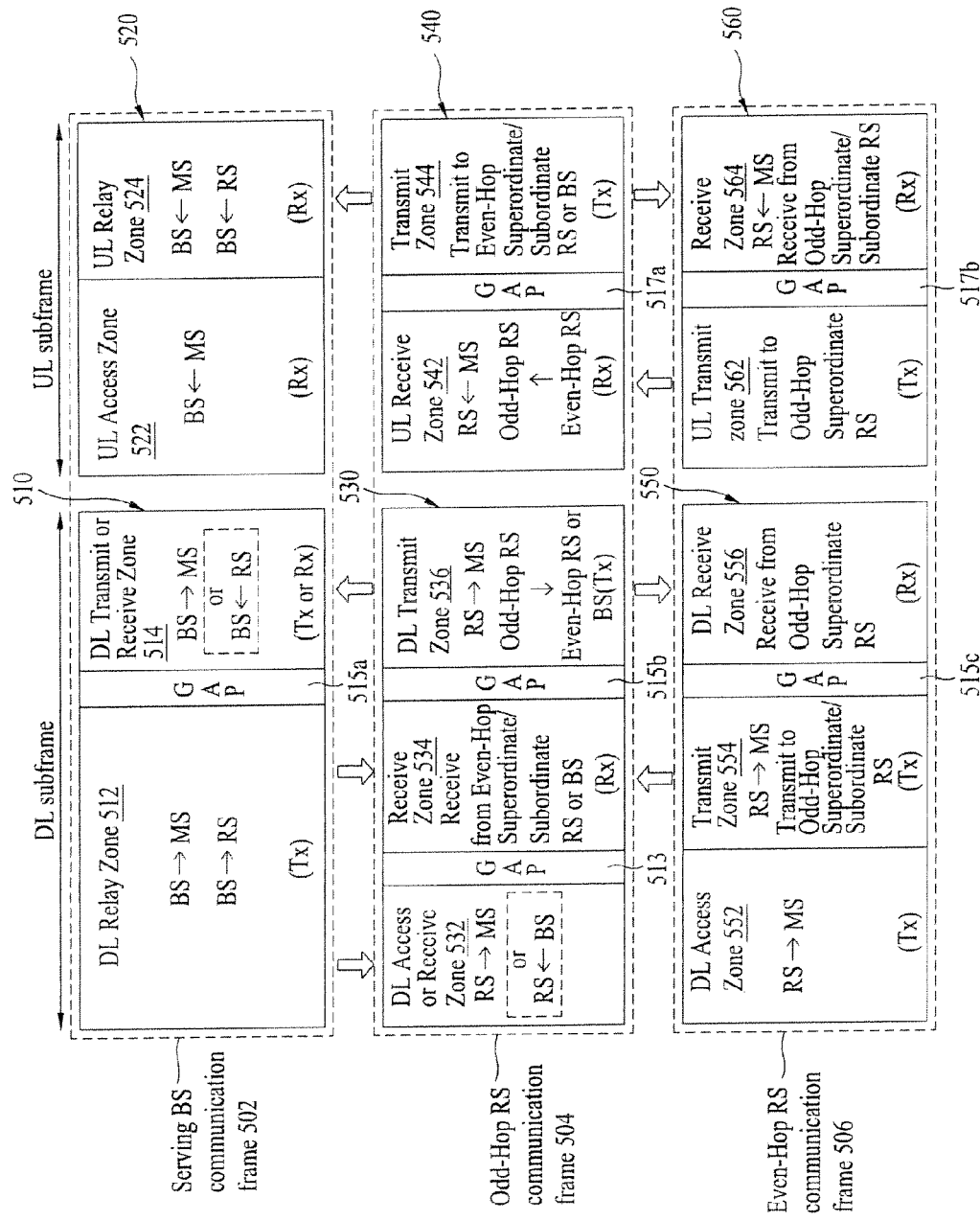
FIG. 5 depicts a BS communication frame, an odd-hop relay communication frame, and an even-hop relay communication frame in accordance with various embodiments of the present invention.

FIG. 5 depicts a BS communication frame 502, an odd-hop RS communication frame 504, and an even-hop RS communication frame 506 in accordance with various embodiments of the present invention. The BS communication frame 502 corresponds to the serving BS 210, the odd-hop RS communication frame 504 corresponds to an odd-hop RS 220, and the even-hop RS communication frame 506 corresponds to an even-hop RS 230.

As shown in FIG. 5, the BS communication frame 502 includes a downlink (DL) period 510 and an uplink (UL) period 520, odd-hop RS communication frame 504 includes a DL period 530 and a UL period 540, and even-hop RS communication frame 506 includes a DL period 550 and a UL period 560. A mobile station may receive DL data in a DL period and may transmit UL data in a UL period.

In one embodiment, the DL periods 510, 530, and 550 occur in a substantially concurrent manner and the UL periods 520, 540, and 560 occur in a substantially concurrent manner. The operation of DL periods 510, 530, and 550 will now be discussed with reference to FIG. 5.

For example, in the DL period 510, the serving BS 210 is configured to transmit to the MS 105 and the odd-hop RS 220 during the DL relay zone 512. During the DL transmit or receive zone 514, the serving BS 210 can be configured to either transmit to the MS 105 or receive from the odd-hop RS 220.

In one embodiment, if the serving BS 210 is configured to receive from the odd-hop RS 220 during the DL transmit or receive zone 514, gap 515a is optionally included in the DL period 510 following the DL relay zone 512. In another embodiment, if the serving BS 210 is configured to transmit to the MS 105 and not receive from the odd-hop RS 220, the gap 515a can be omitted.

In the DL period 530, during the DL access or receive zone 532, the odd-hop RS 220 is configured to either receive from the serving BS 210 or to transmit to the MS 105. During the receive zone 534 following the gap 513, the odd-hop RS 220 is configured to receive from either the superordinate or subordinate even-hop RS 230 or the serving BS 210. During the DL transmit zone 536 following the gap 515b, the odd-hop RS 220 is configured to transmit to the MS 105, the even-hop RS 230, or to the serving BS 210 and one or more subordinate stations, such as the MS 105 or the even-hop RS 230.

If the serving BS 210 is configured to receive during the DL transmit or receive zone 514, the odd-hop RS 220 is configured to operate as a bi-directional relay which may transmit network coded data to both the serving BS 210 and one or more child stations, such as the MS 105 or RS 230.

If the odd-hop RS 220 is configured to receive during the DL access or receive zone 532, the serving BS 210 can be configured to send scheduling information and data to both the odd-hop RS 220 and a child station of the odd-hop RS 220, such as the MS 105. In DL transmit zone 536, the odd-hop RS 220 can relay the received data during the DL access or receive zone 532 as if it is transmitted from the serving BS 210 by using, for example, the channelization of the serving BS 210. The child station of the odd-hop RS 220, such as the MS 105, receives the data as if it is the second transmission from the serving BS 210. Optionally, if the serving BS 210 is configured to transmit during the DL transmit or receive zone 514, both the odd-hop RS 220 and the serving BS 210 can transmit data to the child station of the odd-hop RS 220, such as the MS 105, in a substantially concurrent manner.

In the DL period 550, during the DL access zone 552, the even-hop RS 230 is configured to transmit to the MS 105. During the transmit zone 554, the even-hop RS 230 is configured to transmit to the MS 105 and to a superordinate or subordinate odd-hop RS 220. During the DL receive zone 556 following the gap 515c, the even-hop RS 230 is configured to receive from a superordinate odd-hop RS 220.

The operation of UL periods 520, 540, and 560 will now be discussed with reference to FIG. 5. For example, in the UL period 520, the serving BS 210 is configured to receive from the MS 105 during the UL access zone 522. The serving BS 210 is configured to receive from the MS 105 and from the odd-hop RS 220 during the UL relay zone 524.

In the UL period 540, the odd-hop RS 220 is configured to receive from the MS 105 and to receive from the even-hop RS 230 during the UL receive zone 542. Following the gap 517a, the odd-hop RS 220 is configured to transmit to a superordinate or subordinate even-hop RS 230 or the serving BS 210 during the transmit zone 544.

In the UL period 560, the even-hop RS 230 is configured to transmit to either the superordinate odd-hop RS 220 during the UL transmit zone 562. Following the gap 517b, the even-hop RS 230 is configured to receive from the MS 105 and either a superordinate relay station, such as the odd-hop RS 220, or subordinate odd-hop relay station during the receive zone 564.

In one embodiment, the odd-hop RS 220 can be configured to transmit using network coding techniques. For example, during the DL transmit zone 536, which is also herein referred to as a network coding zone, the odd-hop RS 220 can transmit using network coding techniques as described below.

When using network coding techniques, the odd-hop RS 220 does not send messages to the serving BS 210 and a child station, such as the MS 105 or the even-hop RS 230, separately. For example, a first message transmitted by the MS 105 and a second message transmitted by the serving BS 210 may be both received by the odd-hop RS 220. The first and second messages are network coded in the odd-hop RS 220. Accordingly, the odd-hop RS 220 may transmit a network-coded packet including a network-coded version of the first message and the second message, wherein the network-coded packet may be received by both the serving BS 210 and MS 105. The odd-hop RS 220 may transmit the network-coded packet by multicasting. In some scenarios, the odd-hop RS 220 applies an "exclusive or" (XOR) operation to the first message and the second message to enable the serving BS 210 or MS 105 to recover the message it is intended to receive.

Accordingly, by network coding uplink and downlink transmissions in the odd-hop RS 220, and applying an XOR operation thereto, bandwidth consumption by the odd-hop RS 220 may be reduced because one resource for the odd-hop RS 220 is used instead of two.

For example, when the serving BS 210 receives the network-coded packet, the serving BS 210 may recover the first message transmitted by the MS 105 by utilizing previously-transmitted downlink information, such as the second message, in an XOR operation. Similarly, when the MS 105 receives the network-coded packet, the MS 105 may recover the second message transmitted by the serving BS 210 by utilizing the first message in an XOR operation.

Figure 6:
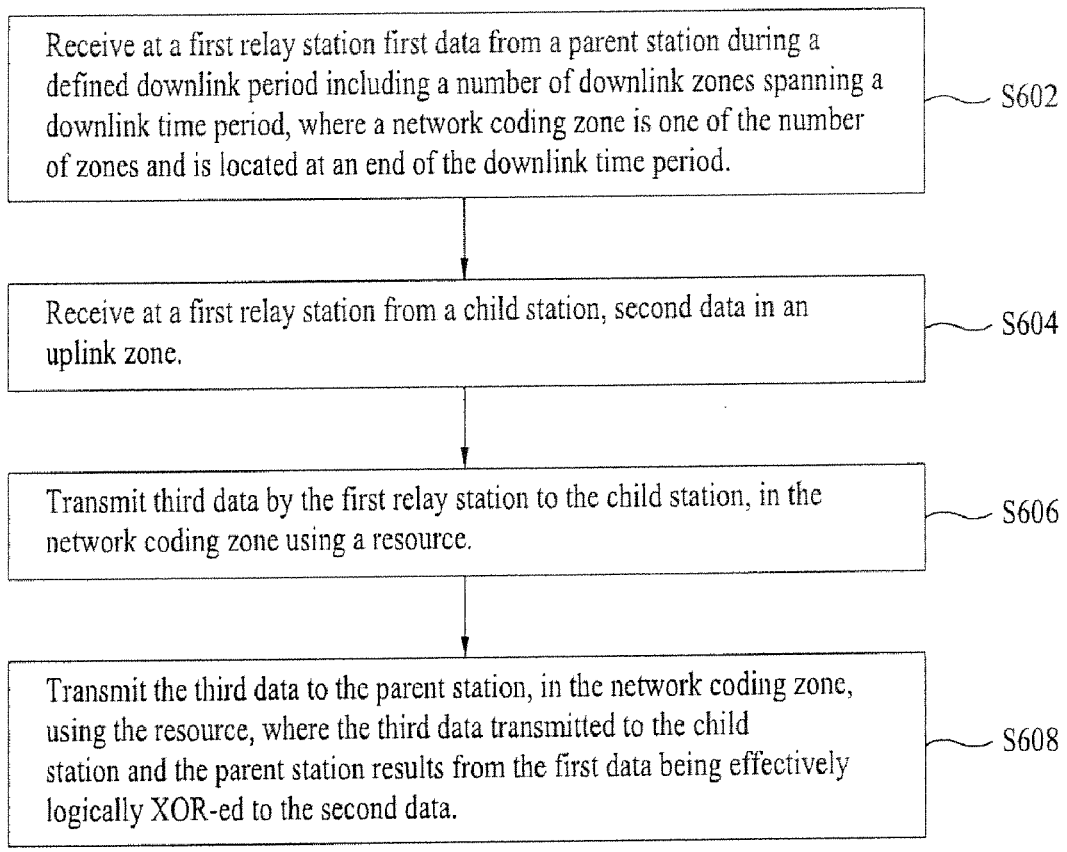
FIG. 6 is a flow chart of a method for transmitting data according to an exemplary embodiment of the present invention.

FIG. 6 is a flow chart of a method for transmitting data according to an exemplary embodiment of the present invention.

As shown in FIG. 6 the odd-hop RS 220 receives first data from a parent station, such as the serving BS 210, during a defined downlink period including a number of downlink zones spanning a downlink time period, where a network coding zone is one of the number of downlink zones and is located at an end of the downlink time period and where the first data is received in at least one of the plurality of downlink zones other than the network coding zone (S602).

The odd-hop RS 220 receives from a child station, such as the MS 105 or the even-hop RS 230, second data in an uplink zone (S604) and transmits third data to the child station in the network coding zone using a resource (S606).

The odd-hop RS 220 transmits the third data to the parent station in the network coding zone using the resource, where the third data transmitted to the child relay station and the parent station results from the first data being effectively logically XOR-ed to the second data (S608).

It should be understood that in alternative implementations, certain logic operations may be performed in a different order, modified or removed and still implement embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

The foregoing embodiments and advantages are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for transmitting data, the method comprising:
receiving at a first relay station first data from a parent station during a downlink period comprising a plurality of downlink zones, wherein a network coding zone is one of the plurality of downlink zones and is located at an end of the downlink period, and wherein the first data is received in at least one of the plurality of downlink zones other than the network coding zone;
receiving at the first relay station from a child station, second data during an uplink zone;
transmitting third data by the first relay station to the child station, during the network coding zone using a resource; and
transmitting the third data to the parent station, during the network coding zone, using the resource, wherein the third data transmitted to the child station and the parent station results from the first data being effectively logically XOR-ed to the second data.

2. The method of claim 1, wherein the second data is received during an uplink period occurring prior to the downlink period.

3. The method of claim 1, wherein the first relay station is at least a transparent relay or a bi-directional relay.

4. The method of claim 1, wherein the first relay station is an odd-hop relay station and the child station is an even-hop relay station.

5. The method of claim 4, wherein the odd-hop relay station is in direct communication with the parent station.

6. The method of claim 1, wherein the child station is a mobile station or a relay station.

7. A method for transmitting data at a relay station (RS) using a Time Division Duplex (TDD) frame structure comprising a plurality of TDD frames, each of the TDD frames comprising a downlink (DL) period and an uplink (UL) period, in a wireless communication system, the method comprising:
receiving first data from a child station during a first UL zone of a plurality of UL zones of the UL period, wherein the first UL zone is located at a beginning of the UL period; and
transmitting second data to a parent station during a second UL zone of the plurality of UL zones of the UL period, wherein the second UL zone is located at an end of the UL period,
wherein, in each of the plurality of TDD frames, a gap zone of the UL period is located between the first UL zone and the second UL zone such that the first UL zone is immediately followed by the gap zone and the gap zone is immediately followed by the second UL zone.

8. The method of claim 7, wherein the child station is an even-hop relay station or a mobile station.

9. The method of claim 8, wherein the relay station is in direct communication with the parent station.

10. The method of claim 9, wherein the parent station is a base station.

* * * * *